(12) United States Patent
Gaubert

(10) Patent No.: US 7,107,896 B1
(45) Date of Patent: *Sep. 19, 2006

(54) METHOD AND DEVICE FOR INERTING A VAT FOR CONSUMABLE LIQUID, IN PARTICULAR WINE, AND CORRESPONDING INERTING GAS

(75) Inventor: Guy Gaubert, Saint-Sulpice et Cameyrac (FR)

(73) Assignee: L'Air Liquide Societe Anonyme pour l'Etude et l'Exploitation des Procedes Georges Claude, Paris (FR)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 581 days.

(21) Appl. No.: 08/978,055

(22) Filed: Nov. 25, 1997

(30) Foreign Application Priority Data

Nov. 29, 1996 (FR) .................................. 96 14690

(51) Int. Cl.
*C12F 3/02* (2006.01)
*C12L 9/00* (2006.01)
*A23L 2/54* (2006.01)

(52) U.S. Cl. ...................... 99/323.1; 426/312; 426/319

(58) Field of Classification Search ................ 426/312, 426/316, 319, 592; 99/323.1, 323.2, 277.1; 239/288, 288.5, 559, 567
See application file for complete search history.

(56) References Cited

U.S. PATENT DOCUMENTS

| 597,955 | A | * | 1/1898 | Ciani .......................... 99/323.1 |
| 917,728 | A | * | 4/1909 | Hare ............................ 239/430 |
| 1,035,127 | A | * | 8/1912 | Windemuller ............. 239/288.5 |
| 2,978,187 | A | * | 4/1961 | Hesson ..................... 239/288.5 |
| 2,985,385 | A | * | 5/1961 | Bowers et al. ............ 239/288.5 |
| 3,379,344 | A | * | 4/1968 | Cornelius ................... 99/323.1 |
| 3,814,147 | A | * | 6/1974 | Lindberg ...................... 141/94 |
| 4,901,887 | A | * | 2/1990 | Burton ........................ 222/131 |
| 5,604,297 | A | * | 2/1997 | Seiden et al. ................ 73/19.1 |

FOREIGN PATENT DOCUMENTS

| DE | 27 44 767 | | 4/1979 |
| DE | 252584 | * | 12/1987 |
| FR | 928053 | | 11/1947 |
| FR | 2107946 | | 5/1972 |
| FR | 2516483 | | 11/1981 |
| FR | 365563 | | 12/2005 |
| GB | 1371027 | | 10/1974 |
| GB | 1408995 | | 12/1975 |
| WO | 93/20181 | * | 10/1993 |

OTHER PUBLICATIONS

Lewis, D., Blanketing in Storage Tanks The Australian Grapegrower and Winemaker, Apr. 1990.*
Westrick, M., Managing oxygen in white wine production, Practical Winery and Vineyard, pp. 49-52, May/Jun., 1996.*
Allen D., Gas Diffuser proves beneficial, Winepress, p. 14, Jun. 1996.*

* cited by examiner

*Primary Examiner*—Keith Hendricks
(74) *Attorney, Agent, or Firm*—Buchanan Ingersoll & Rooney

(57) ABSTRACT

A method of inerting a vat including an upper wall and containing a consumable liquid and an overhead gas, comprising the steps of
  injecting an inerting gas heavier than air at a velocity into the overhead gas above a free surface of the liquid and substantially below the upper wall of the vat and, during this injection,
  removing excess gas through a purge orifice of the vat.

11 Claims, 2 Drawing Sheets

METHOD AND DEVICE FOR INERTING A VAT FOR CONSUMABLE LIQUID, IN PARTICULAR WINE, AND CORRESPONDING INERTING GAS

BACKGROUND OF THE INVENTION (i) Field of the Invention

The present invention relates to a method of inerting a vat containing a consumable liquid, in particular wine, of the type in which an inerting gas heavier than air is injected into the gas overhead of the vat and, during this injection, the excess gas is removed through a purge orifice of the vat.

(ii) Description of Related Art

In the current technique of inerting wine vats, the flushing with gas is carried out on vats provided with an orifice available for letting gas in, generally a lateral tap on the vent of the vat, and a purge orifice placed at the center for accessing the vat.

In this case, it is possible to flush with gas by dilution with gases such as nitrogen or a nitrogen/$CO_2$ mixture.

However, this technique is not fully satisfactory, because a relatively long flushing process, consuming a large quantity of inerting gas, needs to be carried out in order to reach a sufficiently low residual oxygen level (typically less than 1%). Further-more, this technique cannot be employed when the vat is provided with a single opening in its upper part, which is frequently the case.

SUMMARY AND OBJECTS OF THE INVENTION

The object of the invention is to allow rapid, reliable and economical inerting of wine vats, even ones provided with a single upper opening.

To this end, the invention relates to an inerting method of the aforementioned type, characterized in that the inerting gas is injected into the vat substantially below the upper wall of the vat and close to the free surface of the liquid.

The method according to the invention may include one or more of the following characteristics:

the velocity of the inerting gas close to the free surface of the liquid is reduced just before it is injected;

the oxygen level in the gas overhead of the vat is measured, and the injection is stopped when this level is less than or equal to a predetermined maximum value;

use is made of an inerting gas containing substantially 75 to 80% of a neutral gas, in particular argon, the remainder being carbon dioxide ($CO_2$).

The invention also relates to a device for inerting a vat for consumable liquid, in particular wine, intended for implementing such a method. This device, of the type comprising a source of an inerting gas heavier than air, an orifice, connected to this source, for letting gas into the vat, and an orifice for purging the vat, is characterized in that it comprises at least one downward injection tube intended to be connected via its upper end to the inlet orifice and extending to near the free surface of the liquid.

The device according to the invention may include one or more of the following characteristics:

the injection tube has a gas diffuser at its lower end;

the upper part of the injection tube is enclosed by the side wall of a tubular connector which can be fitted onto an upper opening of the vat, said side wall being provided with said purge orifice;

said side wall is provided with a second orifice to which a safety valve is connected;

the injection tube has an adjustable length;

said source contains a mixture of substantially 75 to 80% of a neutral gas, in particular argon, and of carbon dioxide.

The invention further relates to an inerting gas for consumable liquid, in particular wine, which can be used in the method and the device which are defined above. This inerting gas consists of substantially 75 to 80% of argon and of carbon dioxide, preferably of substantially 80% of argon and 20% of carbon dioxide.

BRIEF DESCRIPTION OF THE DRAWINGS

An illustrative embodiment of the invention will now be described with reference to the appended drawings, in which.

DETAILED DESCRIPTION OF PREFERRED EMBODIMENTS

Figure 1:
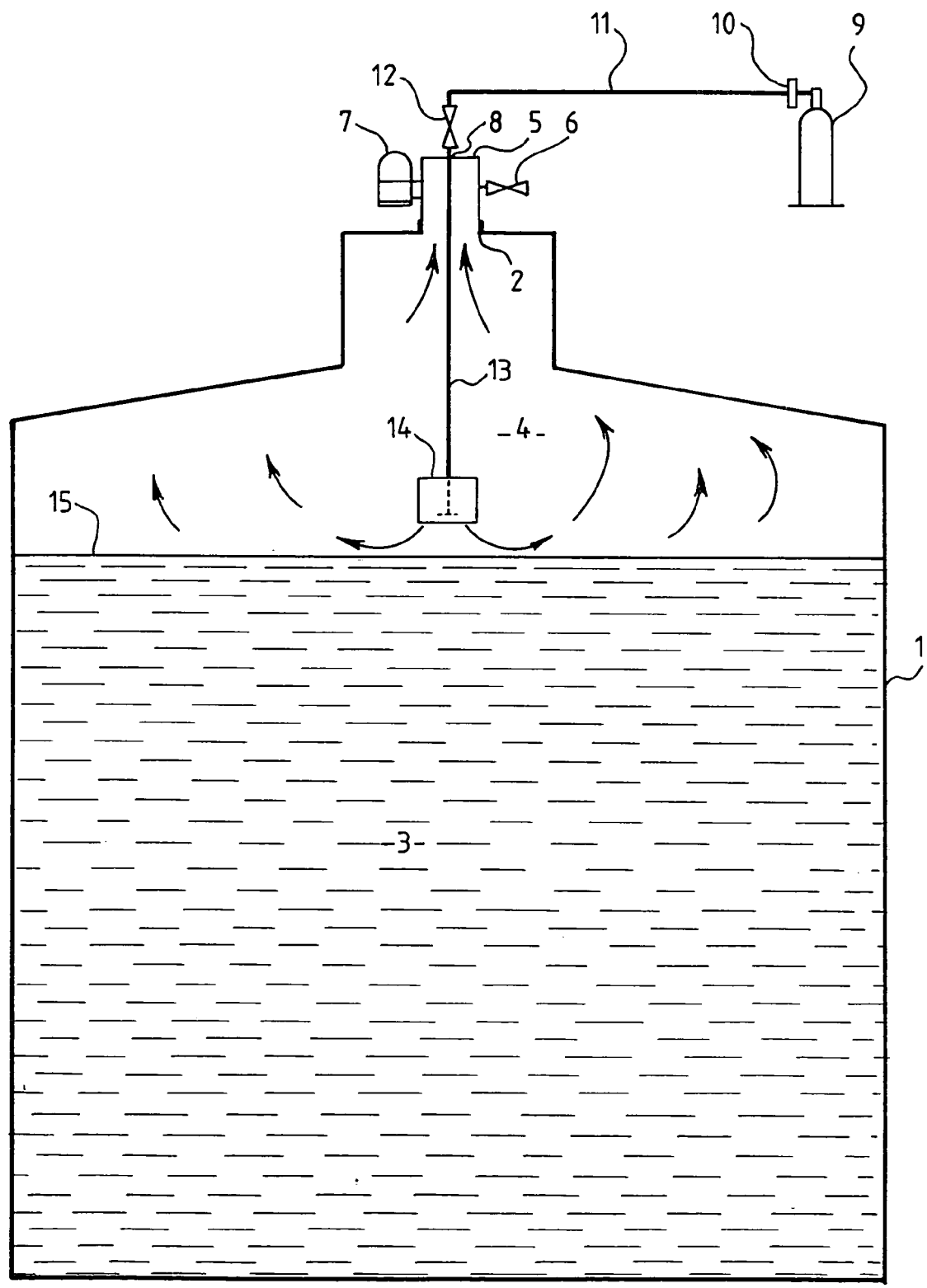
FIG. 1 schematically represents a wine vat equipped with an inerting device according to the invention.

The vat 1 schematized in FIG. 1, having a relatively large capacity of, for example, 150 hl, has a single tapped opening 2 in its upper part, this opening being normally closed by a conventional removable hatch of the Bellot type or similar (not shown). The vat contains a mass of wine 3 to be inerted, leaving a gas overhead 4 representing, for example, several $m^3$.

The lower part of a polyethylene connector 5 is screwed into the opening 2, this connector being provided at the side with a purge valve 6 and a safety valve 7 and, at the top, with an inerting gas inlet 8. The latter is connected, via a conduit 11 provided with a shut-off valve 12, to a bottle 9 which contains the inerting gas under pressure and is equipped with a pressure reducer 10. The pressure reducer 10 has two stages, namely a first stage which reduces the pressure to about 3 bar, and a second stage for reduction to about 20 mb (relative pressures).

A vertical extension tube 13, equipped at its lower end with a gas diffuser 14, passes through the connector 5 from bottom to top and is screwed via its upper end into the lower part of the gas inlet 8. As can be seen in FIG. 1, the diffuser 14 is located just above the free surface 15 of the wine.

Figure 2:
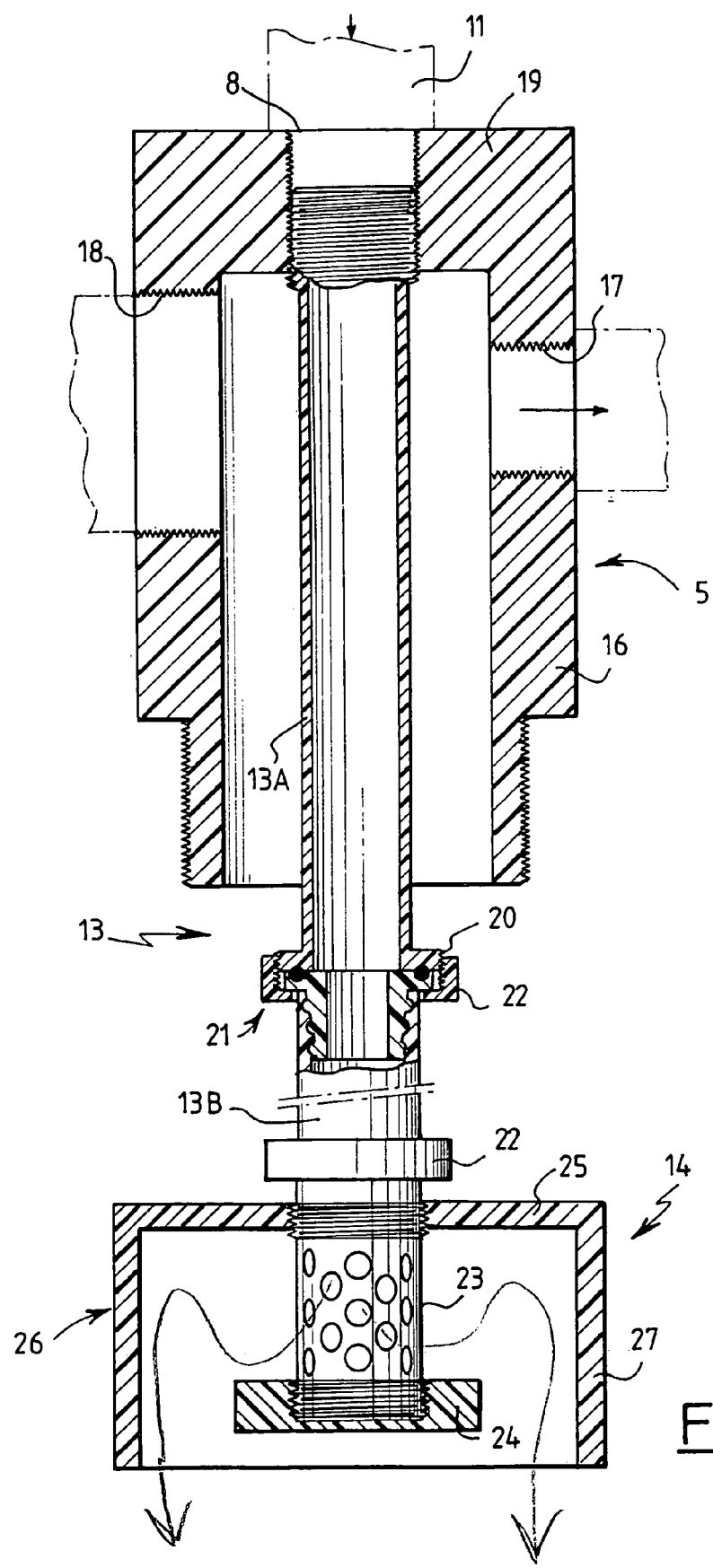
FIG. 2 represents a part of the inerting device, on a larger scale and partially in longitudinal section.

As can be seen in more detail in FIG. 2, the connector 5 has the shape of an inverted dish. Its side wall 16 is pierced by two diametrically opposite holes 17, 18 for connecting the purge valve 6 and the safety valve 7, respectively. Its upper end 19 is pierced by a tapped central hole constituting the gas inlet 8. The conduit 11 is connected to this hole at the top, and the upper end of the extension tube 13 is connected to this hole at the bottom.

In the example which is represented, the extension tube 13 is made in two parts: on the one hand, a fixed upper part 13A made of polyvinyl chloride (PVC) screwed into the inlet 8 via its upper end and extending downward below the connector 5, the lower end of this part 13A being equipped with a screw-threaded connection flange 20. On the other hand, an interchangeable lower part 13B consisting of a tube, also made of flexible PVC, equipped at each end with a connection device 21 having a knurled nut 22.

The diffuser 14 consists of a PVC tube whose part 23 is perforated, whose lower end is closed off by a horizontal plate 24 which is much larger in area than the cross section of the tube, and whose upper part, which is not perforated, is screwed through the upper end 25 of a bell 26. Above the end 25, the tube 23 ends in a screw-threaded connection flange similar to the flange 20. The skirt 27 of the bell 26 extends below the plate 24.

The bottle 9 contains a gas mixture consisting of 80% of argon and 20% of carbon dioxide ($CO_2$). The safety valve 7 is adjusted so as to open when a predetermined overpressure and a predetermined underpressure are reached, for example an overpressure of 45 mb and an underpressure of 5 mb. Furthermore, it is possible to sample the atmosphere in the vat at the purge valve 6 in order to measure the oxygen level in the gas overhead of the vat.

During operation, the vat being filled partially with wine to the extent indicated above, the valves 12 and 6 are opened. The argon/$CO_2$ mixture then enters the vat through the conduit 11, the tube 13 and the diffuser 14. The flow rate of the gas is adjusted by the overpressure brought about by the pressure reducer 10. This overpressure is typically about 20 mb, which gives a flow rate of the order of 200 l/min.

Upon reaching the vat, the gas essentially loses its velocity because of the diffuser 14, and is deposited gently on the free surface 15 of the wine. The build-up of gas on the wine causes a piston effect which flushes the air through the purge valve 6.

A particularly rapid reduction in the oxygen level is observed when performing a series of analyses by sampling the atmosphere of the gas overhead at the purge valve 6. Furthermore, the gas which is chosen proves to be a multipurpose gas: its $CO_2$ level is sufficient to keep white wines fresh, but low enough in order, by dissolving $CO_2$, to prevent "hardening" of red wines. Of course, this means that the gas in question is also suitable for the conservation of rose wines.

It should be noted that the arrangement of the connector 5, and in particular of the two concentric passages which it provides for inlet and outlet of the gas flows, allows optimum use of the cross section of the single upper opening 2 of the vat, and therefore the use of relatively high gas flow rates.

The invention claimed is:

1. A method of inerting a vat including an upper wall and containing a consumable liquid and an overhead gas, comprising the steps of: injecting an inerting gas heavier than air at a velocity into the overhead gas above a free surface of said liquid and below the upper wall of the vat and, during this injection, removing excess gas through a purge orifice of the vat, wherein the step of injecting said gas comprises passing said inerting gas through at least one downward extending tube having an upper end and a lower end, thereby providing a piston effect which flushes the overhead gas; and wherein:
    the vat is provided with a single upper opening and a tubular connector fitted onto the opening;
    the upper end of said tube is connected to the upper opening;
    the lower end of said tube extends close to the free surface of the liquid; and
    an upper part of said tube is enclosed by a side wall of the tubular connector, the connector having two concentric passages comprising an inlet for the inerting gas and an outlet for the excess gas, the side wall being provided with said purge orifice.

2. The method according to claim 1, further comprising the step of reducing the velocity of the inerting gas close to the free surface of the liquid just before it is injected.

3. The method according to claim 1 further comprising measuring oxygen level in the overhead gas and stopping the injection when this level is less than or equal to a predetermined maximum value.

4. The method according to claim 1, wherein said inerting gas comprises substantially 75 to 80% of a neutral gas and a remainder of carbon dioxide.

5. The method according to claim 1, wherein said consumable liquid is wine.

6. The method according to claim 4, wherein said neutral gas is argon.

7. The method according to claim 1, wherein the lower end of said tube is provided with a diffuser having a lower end closed off by a horizontal plate larger than the cross section of the tube, and wherein the inerting gas is injected into the overhead through a perforated portion of the diffuser above the horizontal plate.

8. A method of inerting a vat including an upper wall and containing a consumable liquid and an overhead gas, comprising the steps of:
    injecting an inerting gas heavier than air at a velocity into the overhead gas above a free surface of said liquid and below the upper wall of the vat and, during this injection, removing excess gas through a purge orifice of the vat, wherein injecting said inerting gas comprises passing said inerting gas through at least one downward extending injection tube having a lower end extending to near said free surface of the liquid, thereby providing a piston effect which flushes the overhead gas; and wherein:
    the vat is provided with a single upper opening and a tubular connector fitted onto the opening;
    the injection tube has an upper end connected to said upper opening;
    an upper portion of the injection tube is enclosed by a side wall of said tubular connector;
    the tubular connector is provided with an inlet passage for injection of the inerting gas and an outlet passage for removal of the excess gas; and
    the side wall of the tubular connector is provided with said purge orifice.

9. The method according to claim 8, wherein the lower end of the injection tube is provided with a diffuser having a lower end closed off by a horizontal plate larger than the cross section of the tube, the inerting gas being injected into the overhead through a perforated portion of the diffuser above the horizontal plate.

10. The method according to claim 1, wherein the connector is composed of a polyethylene and the tube is composed of a polyvinyl chloride.

11. The method according to claim 1, wherein the side wall of the connector is provided with a safety valve.

* * * * *